US008606699B2

(12) United States Patent
Boruhovin

(10) Patent No.: US 8,606,699 B2
(45) Date of Patent: Dec. 10, 2013

(54) MANAGEMENT SYSTEM FOR THE PROTECTION OF MORTGAGE EQUITY

(76) Inventor: Mihail Boruhovin, Houston, TX (US)

( * ) Notice: Subject to any disclaimer, the term of this patent is extended or adjusted under 35 U.S.C. 154(b) by 0 days.

(21) Appl. No.: 13/356,693

(22) Filed: Jan. 24, 2012

(65) Prior Publication Data

US 2013/0191271 A1 Jul. 25, 2013

(51) Int. Cl.
*G06Q 40/02* (2012.01)
(52) U.S. Cl.
USPC .............................. 705/39; 705/35
(58) Field of Classification Search
USPC .......................... 705/38, 35, 36 R
See application file for complete search history.

(56) References Cited

U.S. PATENT DOCUMENTS

| 5,644,726 | A |   | 7/1997  | Oppenheimer |
| 6,012,047 | A | * | 1/2000  | Mazonas et al. ............... 705/38 |
| 6,594,633 | B1 |   | 7/2003  | Broerman |
| 6,609,200 | B2 |   | 8/2003  | Anderson |
| 7,315,841 | B1 |   | 1/2008  | McDonald |
| 8,065,215 | B2 | * | 11/2011 | Yoon ........................... 705/36 R |
| 8,315,889 | B1 | * | 11/2012 | Menzies et al. ................. 705/4 |

* cited by examiner

*Primary Examiner* — James A Vezeris

(57) ABSTRACT

A computer system for managing mortgages of mortgage holders with a no foreclosure rule interconnected to funding institutions maintained as a club. The system has input devices capable of receiving data from the mortgage funding institution or mortgage originator. The home owner club agrees to assume responsibility for providing financing agreements with a no foreclosure clause. A processor calculates values and maintains up to date information as a function of the probability of property values change and the payments on mortgage obligations. A memory has a database storing data relating to mortgages and club members, pools of properties of club members and financial data. An output device produces commitment for club members (assumes obligation for providing security and solutions, and in case of difficulties for members, (maintains mortgage payments) and funding institution assumes obligations. Members may be reimbursed equity positions upon relinquishment of a mortgage obligation.

20 Claims, 3 Drawing Sheets

MANAGEMENT SYSTEM FOR THE PROTECTION OF MORTGAGE EQUITY

CROSS REFERENCE TO RELATED APPLICATIONS none

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of mortgages and more specifically to a Management System for the Protection of Mortgage Equity.

Through all of the history of mortgage financing, there were no institutions or instruments that provided protection to the homeowner in case of personal problems or other unforeseen circumstances that made it impossible to maintain the mortgage. The only protection afforded was to the financial institution, not the homeowner, in the form of mortgage insurance. This can be expensive and not available to most homeowners and does little to protect the homeowner from foreclosure due to ultimate default.

Numerous reasons exist that cause default but among them are loss of job, bankruptcy due to health expenses, relocation of job, divorce and death of the major breadwinner. In each situation, the homeowner may be incapable of maintaining mortgage payments, or in the case of leasing, rent payments, which ultimately result in losing the mortgage or lease. This insecurity of payment by the mortgage holder creates not only a problem for the country's economy but also greatly affects other homeowners as the "domino" effect takes hold and numerous properties go into foreclosure.

Prior art systems that sought to alleviate some of these problems include: U.S. Pat. No. 5,644,726 entitled "Method and System implementing a mortgage partnership," issued Jul. 1, 1997; U.S. Pat. No. 7,315,841 entitled "Mortgage loan and financial services Data processing," issued Jan. 1, 2008; U.S. Pat. No. 6,012,047 entitled "Reverse Mortgage Processing System;" U.S. Pat. No. 6,609,200 entitled "System for Processing Electronic Mortgage Document" and U.S. Pat. No. 6,594,633 entitled "Real Estate Computer Network." None of these prior art systems teach the benefits and advantages of the present invention.

This process and method of the present invention provides insurance and a solution for home owners and prospective home owners who want to join a Home Owner Club by buying or leasing a home, condominium, townhouse or other dwelling. The present invention can also be applied to commercial properties and building. By pooling a group of homeowners and property owners into a unified system, the various dislocations caused by individual failure to meet mortgage payments is smoothed out as a vehicle now exists to resolve the individual problem through a collective mechanism. The present invention relates to a computer system for managing mortgages of large groups of home owners (new mortgages initiation/financing, existing mortgage owners/refinancing and planning to buy a house leasing property occupied) with a no foreclosure rule (taking out of risk and providing an instrument for homeowner to select the right choices in time of foreclosure difficulty to maintain the mortgage payment). It also may help with current government mortgage regulations and laws to lessen the impact of foreclosure type events.

There exists a need for an efficient and comprehensive system for maintaining a large number of mortgages for home owners and flexibility in transferring into a pool those that cannot be maintained, for use or assumption by others. One of the benefits of this invention is that home owners would never face a foreclosure as the collective group would "buy" out their loan, relocate the homeowner and store the property for future use by another member or new member to the club and be an in effect a property manager to facilitate the move to another property or dwelling. In this way, foreclosure to the individual and all of the problems that go with it are largely eliminated.

BRIEF SUMMARY OF THE INVENTION

The primary advantage of the invention is to provide an improved mortgage system that pools mortgage holders together resulting in joint protection against foreclosure.

Another advantage of the invention is to provide a club membership vehicle to allow flexible relocation from dwelling to dwelling without significant financial harm.

Yet another advantage of the invention is to provide a system for maintaining a pool of properties from which club members can use to facilitate ownership or leasing.

Still yet another advantage of the invention is to provide easy exchange of properties in different geographical locations or having different values.

Another advantage of the invention is to provide club members job placement services to facilitate relocation.

Another advantage of the present invention is to provide a hedging mechanism for funding institutions.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a system for protection of mortgage holders having a first set of data representative of a plurality of members having a first obligation pertaining to a real property dwelling, a second set of data representative of a plurality of real property dwellings, a club having members that maintains the first and second sets of data, a processor for matching the member with one of the plurality of real property dwellings upon request of the member based on one or more events recognized by the system and relinquishment of the first obligation, and a storage of the member's first obligation into a pool accessible to other members or third parties to assume or partially assume.

In accordance with another preferred embodiment of the invention, there is disclosed a computer system for managing mortgages of large groups of home owners (new mortgages initiation/financing, existing mortgage owners/refinancing and planning to buy a house leasing property occupied) with a no foreclosure rule (taking out of risk and providing an instrument for home owners to select the right choices in time of foreclosure difficulty to maintain the mortgage payment, or to cash out their equity in the property). The system provides a conduit to various funding institutions and various alternatives to default.

In accordance with another preferred embodiment of the invention, there is disclosed a home owner club for protection of mortgage holders having a plurality of registered members having a mortgage obligation pertaining to a real property dwelling, a storage of data representative of a plurality of real property dwellings, a member based group comprising the members and funding institutions that maintains data representative of the registrants and the plurality of real property dwellings, a processor for matching the member with one of the plurality of real property dwellings upon request of the member based on one or more events recognized by the processor and by relinquishment of the mortgage obligation to the member based group or the funding institution and storage of the member's mortgage obligation into a pool accessible to other members or third parties to assume or partially assume.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
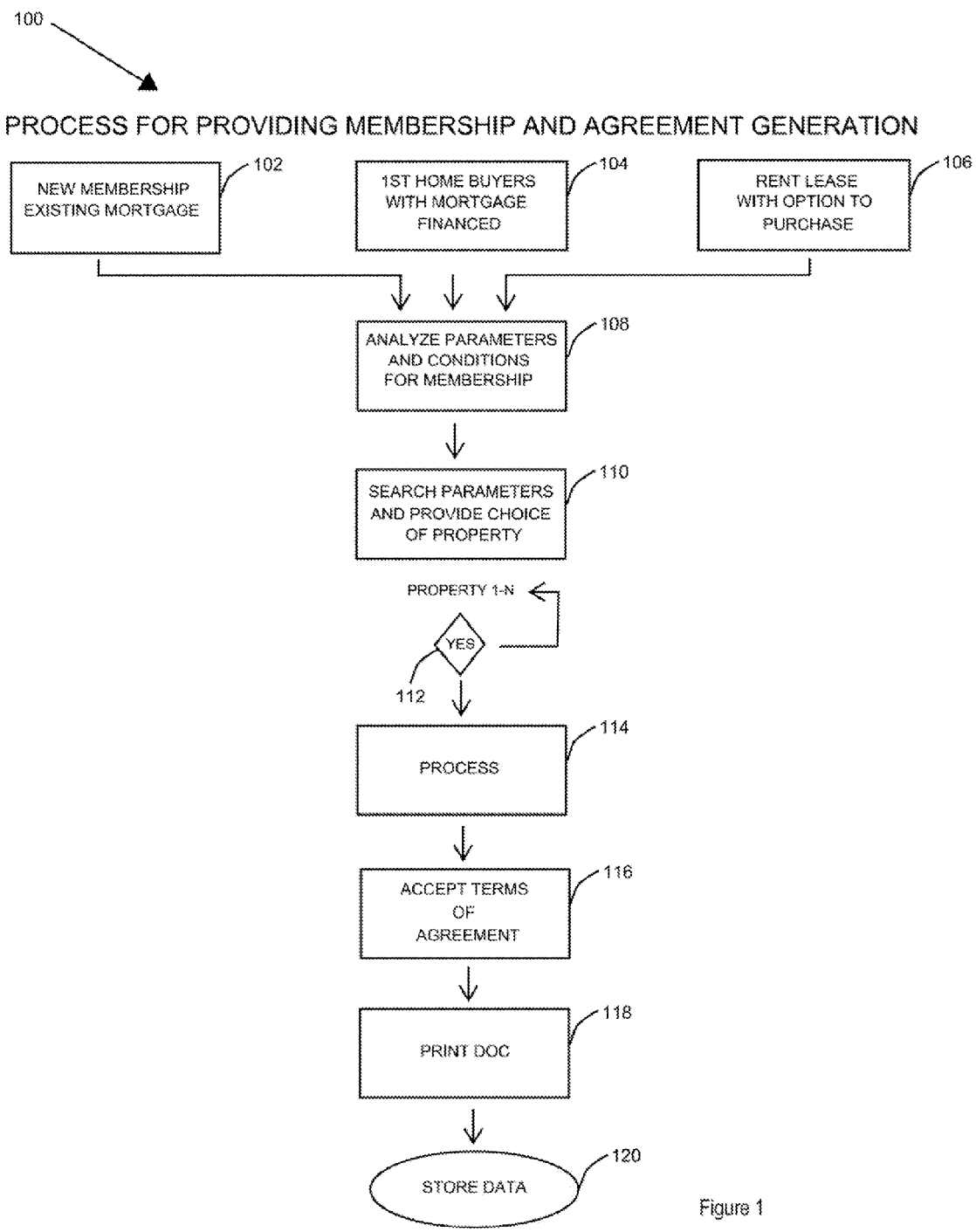
FIG. 1 shows a block diagram of a preferred embodiment of the invention.

FIG. 1 shows a block diagram of Process for Providing Membership and Agreement Generation 100 according to a preferred embodiment of the invention. Generally, there exist at least three major categories of members in the Home Owner Club of the present invention. New members with existing mortgages 102, first time home buyers with financed mortgages 104 and renter or lessees 106. In the case of the lessee or renter, there may be an option to purchase the home as well. First time home buyers 104 typically are in need of mortgage financing at an entry level. Renter or lessee members 106 would be those with a lease option to purchase or can be simply members who choose to reduce their living expenses by moving from a mortgaged property to a leased one.

The next step in the process is the analysis step 108 involving analysis of the various parameters and conditions for membership further described below. This step applies to all three of the foregoing classes of members. Information pertaining to each potential member would include, but not be limited to: age, gender, marital status, children, income, education, financial (credit card, investment, retirement plans), professional experience (resume), interests (pets, hobbies, religion etc.). This information would be stored and analyzed at step 110 to identify potential choices of property of a member. Members could use existing networks and internet vehicles to access the system, including Twitter®, Google®, Facebook®, My Space®, and others. Each group of members will be subject to a pre-determined computer algorithm that all use information pertaining to the member to search the data base to locate a range of properties and generate proposals for that member. The system provides property owners with an option that would allow them to obtain money based on the equity in their properties without incurring debt, and that would preferably allow them to continue to live in or otherwise use/occupy their properties with the same or similar degree of control as previously possessed.

As properties are identified that fit pre-determined criteria for that particular member, they are reviewed and presented at step 112 for final decision of the member. If a property is presented that is not suitable, step 112 has a no response and finds other properties. If the property fails to satisfy the criteria or if the member chooses to change the criteria, the algorithm will begin a new processing step and generate various outputs from which documentation can be generated. If the property proposed at step 112 is appropriate, a yes response is determined and sent to step 114 that would then involved processing the property type to generate appropriate agreement terms at step 116. From there, the agreement would be printed at step 118 and all of the data stored pertaining to that member and the property and its particulars stored in a database at step 120. For existing owners, choices may be presented that include transfer of the mortgage to a new lender with better terms, or a new property with better terms. For the lease with option to buy, the member will be presented with terms such as price, time of lease, dollar amount to pay for down payment at the end of the lease, and mortgage rate of interest and time period of loan. In some embodiments, rental customers could come from outside and not from membership in order to rent vacant property.

Members would be able to rent their properties for a variety of reasons, including income problems, temporary relocation, or desire to reduce housing expense, to name a few. Members could select properties they desire and that meet their selected criteria. If a member wishes to change the parameters, they may do so, and generate a new potential property, terms of agreement and other particulars.

Figure 2:
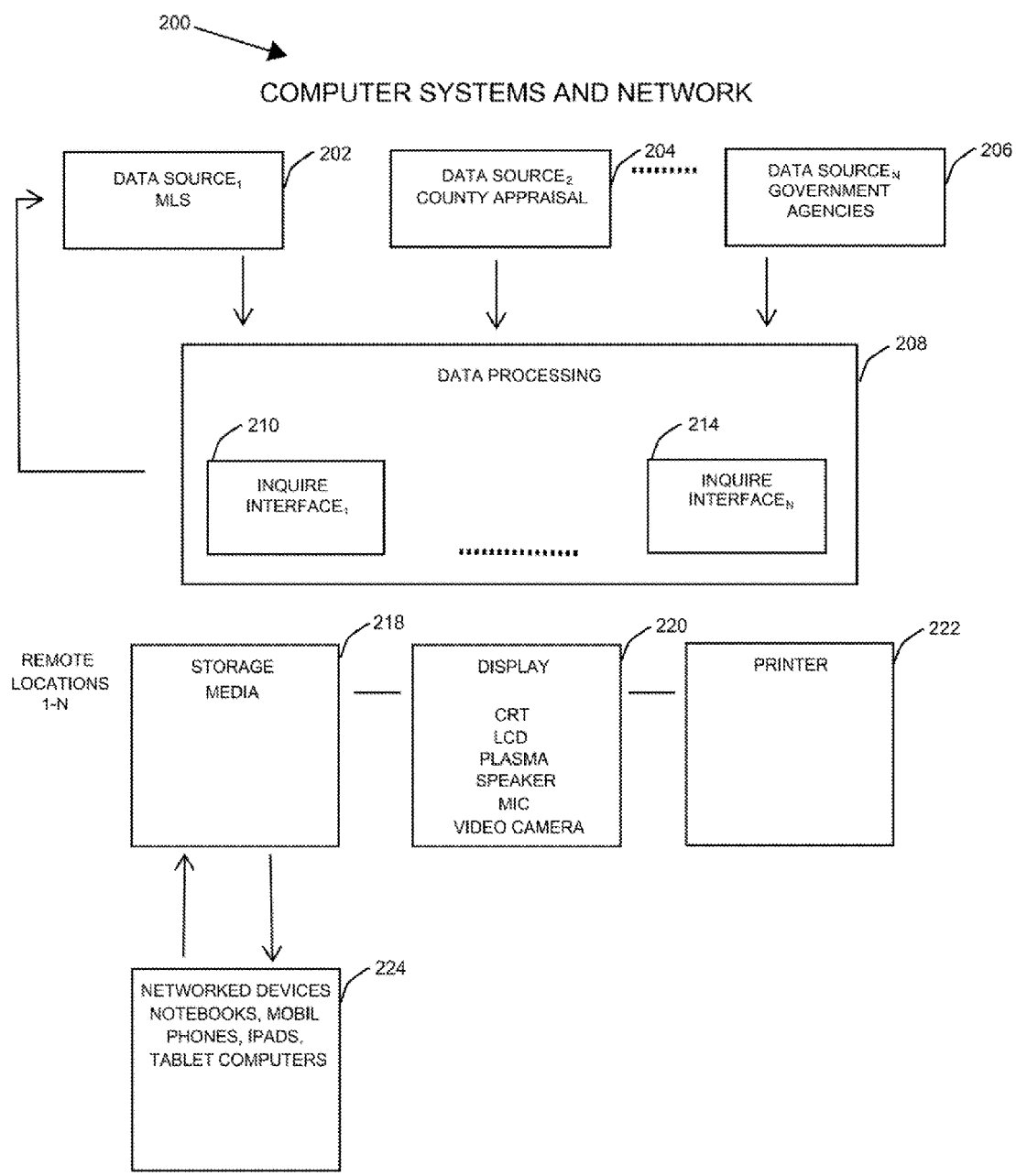
FIG. 2 shows a block diagram of the process according to a preferred embodiment of the invention.

FIG. 2 shows a block diagram of a type of computer system and network 200 that may be used in accordance with a preferred embodiment of the invention. Computer systems and networks may be configures that consist of data processing units which have interface utilizing hardware and software that allow access to different data sources of properties, personal information, financial etc. It may also provide processing and maintain databases on individual files of all members. Data would be stored pertaining to properties in a number of modules similar to module 202, 204 and 206. There may be any number of such modules, but illustratively is shown data source module 202 having data from the Multiple Listing type services, commonly known as MLS, data source 204 county appraisals databases and data source 206 having government database information. Data sources may be of any number from 1 to N as shown.

Data pertaining to individual dwellings may be derived from The S&P/Case-Shiller® Metro Area Home Price Indices which are designed to be a reliable and consistent benchmark of housing prices in the United States. Their purpose is to measure the average change in home prices in a particular geographic market. They cover ten major metropolitan areas (Metropolitan Statistical Areas or MSAs), which are also aggregated to form a national composite. The indices measure changes in housing market prices given a constant level of quality. Changes in the types and sizes of houses or changes in the physical characteristics of houses are specifically excluded from the calculations to avoid incorrectly affecting the index value. The composite home price index is constructed to track the total value of single-family housing within its constituent metro areas:

$Index_{ct} = (E_i(\text{Index } it/\text{Index } i0) \times V\, i0)/\text{Divisor}$ Where: IndexCt is the level of the composite index in period t, Index it is the level of the home price index for metro area i in period t, and Vi0 is the aggregate value of housing stock in metro area i in a specific base period 0, where the base period is updated as detailed below.

The Divisor is chosen to convert the measure of aggregate housing value (the numerator of the ratio shown above) into an index number with the same base value as the metro area indices.

Other data points may include the following: record of sold properties in the last 6 month; Record of county appraisal and Tax; Market data for long term interest rate; Condition of property and cost to increase value by remodeling; Analysis using MLS listing and prices.

Other general criteria for property value that may be stored are the following: Zip Code; Type (house, townhome, townhouse, condo, high-rise etc.); Square feet; Bedrooms and bathroom; Lot size; Garage; Year of construction; stories; Style (English, colonial, French, Spanish, Contemporary/modern, traditional, Victorian etc.); School; Condition; Specific of location.

The data is inputted into a data processing step 208 which is accessible through a number of inquire interfaces 210 and 214. Remote access points may be provided for any number 1 through N, each having their own storage media 218, display devices 220 and printer 222. The display may be of any variety of conventional means including CRT, LCD, plasma, speakers, microphones, and video cameras. Further the system may be accessible through networked devices 224 including notebook computers, mobile phones, tablet computers and the like. Remotely located data processing and interface units (network devices) will have access to the Central Processing System and Data Base. The System will operate by utilization of special software which will be preloaded on the unit and allow them to operate in the system environment.

The system has input devices capable of receiving data from the mortgage funding institution or mortgage originator. The home owner club agrees to assume responsibility for providing mortgage agreements with no right of foreclosure. A processor stores property data and calculates a value and maintains up to date information as a function of the probability of property value change and the payments on mortgage obligation. A memory has a database storing the data relating to the mortgages and club members, and pool of properties of club members (location, value, etc.), financial data (rate, fees etc.). An output device produces a commitment for club members (assumes obligation for providing security and solutions in case of difficulties in maintaining mortgage payments) with a funding institution that assumes obligation for additional losses.

This system would permit users throughout the United States, and potentially in foreign countries to participate in the membership club and include their properties to be used for the purposes outlined herein to the benefit of other members or property owners. With source modifications, the system of the present invention can also be used for commercial real estate, office buildings, warehouses, retail spaces and other commercial settings.

Figure 3:
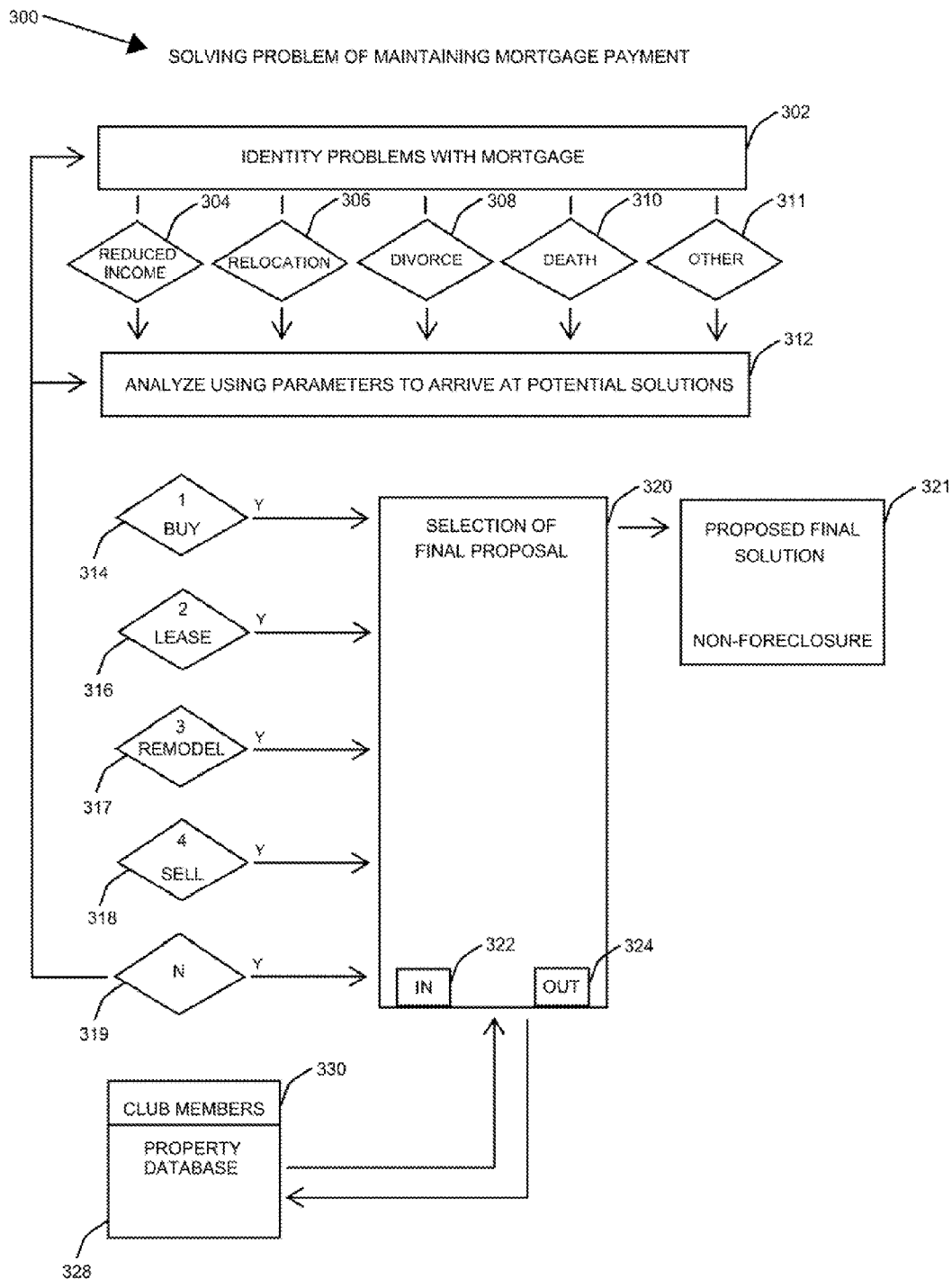
FIG. 3 shows a flow chart of the process according to a preferred embodiment of the invention.

FIG. 3 is a flow chart describing the Solving of Problem of Maintaining Mortgage Payments 300. When a member runs into a problem with mortgage payments, he may put in a request for providing modification to his agreement according to the rules and policies of membership. In step 302, the system analyzes the member's situation and tries to identify what may be causing the payment or default issue or potential for default. A series of queries may be undertaken for any of a number of factors but examples shown are reduced income 304, relocation 306, divorce 308 and death 310. A member may provide details of his particular situation by answering questions from a list and providing information about the changes. Further, the member can state what changes he would like to make allowing the system algorithm to analyze and process the information to generate options. Other 311 may be employed depending on the parameters chosen by the operator and can integrated into the analytic system as described. The system may be programmed to accommodate any of a number of factors, the foregoing being only illustrative.

At step 312, the identified problem or problems are analyzed along with parameters pertaining to the member's previously stored individual criteria to propose a series of potential solutions. Any of a number of solutions may be made available such as buy a property at step 314, lease a property at step 316, sell a property at step 318, or remodel a property at step 317. There may be any of a number of potential solutions including exchange of properties for other geographical locations or for different value with other members or other properties participating in the system. The proposals help provide a feasible and comfortable system of relocation, including potential job placement. Further the database of participating properties may allow for a temporary rent or lease in the same property or less expensive properties. In this process, the funding institution agrees to assume certain risks such as interest rate and credit risk for the mortgage and protecting financing by hedging interest and value of properties across the entire database of participating properties.

As solutions are determined at step 320, property options are derived from the property database 328 which may include member properties 330 and other participating properties or outside properties 328 of non-members. Those options from the database 328 are inputted into the solution module 320 at input 322. As a property becomes available due to relocation, move of a member, or financial relinquishment, those properties may be added to the database through output 324 into database 328. Database 328 would include additional data from a variety of sources. Data collected from a variety of sources (use of public available data on internet) similar to Zillow.com® and other databases.

In case of difficulties making payments on a mortgage, the following solutions available may be: 1) To pay rent and to stay at the same property; 2) To exchange for property with the smaller price and to pay smaller mortgage payment; 3) To exchange for property with the smaller price and to pay smaller mortgage payment; or 4) Provide "reverse mortgage"—using equity accumulated to pay. The home owner need not walk away from the property if membership provides him a solution. Generally, people need a place to live and with the right organization and pooling of properties, most of the problem can be solved by using different types of "instruments." This not only saves people time in solving major life problems, but also provides a healthy environment for human life and family life.

Within the databases, Portfolio of properties can be grouped and structure as follow:

| | |
|---|---|
| Low cost | $50-$80K |
| Medium cost | $100-$190K |
| High cost | $190-$290K |
| Luxury | $300K-up |

When family or individual income drops, problems start piling up and it is very difficult to solve all these problems and at the same time start looking for job. Peace of Mind ("POM") is very important in situations like this.

In an alternative embodiment, because the various parts of the aforementioned system may not be integrated into one organization, joint ventures or networking with other organizations and institutions may be used to provide services and solutions for problems presented here.

The broad use of the internet, computer methods and the latest technology will simplify solving these problems and provide a simple solution. It is important to have services to provide job search and placement, especially in periods of high unemployment. Further, it is difficult to sell a house, further hampering one's ability to move to a new job location. By having a growing pool of properties and grouping them in specific geographical and substantive subsets, it is possible to provide other services to club members at nearby locations.

By working with local institutions as municipalities, charitable organizations, businesses and financial institutions, will provide many instruments for problem solving for home owner of the club. Building financial strength of the club permits the creation of a kind of Credit Union which not only provides loans but also gives members a place to save and invest with very low costs and high returns.

The system acts as de facto insurance for home owners to protect the equity in property. Alternatively the same computer system and method may be applied to commercial real estate loans with owner occupied property to facilitate moves, relocations and to prevent default on leases.

Membership in the club may also provide the following services: tax advice; financial planning; relocation consulting; rent of all items for house; job search and placement and other services pertinent to members and their housing and location needs. The computer system of the present invention can store data pertaining to the above services and make it available to members of the club.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of various embodiments, it will be apparent to those of skill in the art that other variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the issued claims.

The invention claimed is:

1. A system for protection of mortgage holders comprising:
   a. a server having a first database maintaining a first set of data representative of a plurality of members each of said plurality of members having a first obligation pertaining to a first real property dwelling, and a second database on said server maintaining a second set of data representative of a plurality of real property dwellings, wherein said server is comprised of one or more servers;
   b. a computer for matching one of said plurality of members with one of said plurality of real property dwellings upon request of one of the said plurality of members based on one or more events recognized by said system and relinquishment of the one of said plurality of member's said first obligation;
   c. a memory for storing said one of said plurality of member's first obligation into a pool accessible to other members, of said plurality of members, or third parties to assume or partially assume; and
   d. wherein said first and second database store data representative of a credit for equity owned by the one of said plurality of members maintained in said first real property dwelling for use against the purchase or rental of one of said plurality of real property dwellings from said second database.

2. The system for protection of mortgage holders as claimed in claim 1 wherein said first obligation is a mortgage interest loan.

3. The system for protection of mortgage holders as claimed in claim 1 therein said second set of data comprises location, size, price and style of a dwelling.

4. The system for protection of mortgage holders as claimed in claim 1 wherein said events are chosen from a list including death, relocation, job loss, divorce, and reduction in income.

5. The system for protection of mortgage holders as claimed in claim 1 wherein said one of said databases further comprises a financial institution.

6. The system for protection of mortgage holders as claimed in claim 1 wherein said one of a plurality of members is paid for at least some portion of equity interest in said real property.

7. A home owner database management system for protection of mortgage holders comprising:
   a. a server having storage of data on a server representative of a plurality of registered members having a mortgage obligation pertaining to a real property dwelling, storage of data on said server representative of a plurality of real property dwellings, and storage on said server comprising a list of said plurality of registered members and at least one funding institution that maintains data representative of said list of plurality of registered members and said plurality of real property dwellings; wherein said server comprises one or more servers;
   b. a computer processor for matching one of said plurality of registered members with one of said plurality of real property dwellings upon request of said one of said plurality of registered members based both on one or more events recognized by said processor and by relinquishment of said mortgage obligation to another one of a plurality of registered members or said funding institution;
   c. a database for storing one of said plurality of registered member's mortgage obligation accessible by computer search to other members or third parties to assume or partially assume; and
   d. storage of a credit representative of equity of said one of said plurality of registered members toward purchase or rental of one of said real property dwellings upon relinquishment of said mortgage obligation.

8. The home owner database management system for protection of mortgage holders as claimed in claim 7 further comprising a generator of transaction documents for a member pertaining to real property.

9. The home owner database management system for protection of mortgage holders as claimed in claim 7 wherein said second set of data representing real property dwellings comprises location, size price and style of a dwelling.

10. The home owner database management system for protection of mortgage holders as claimed in claim 7 wherein said events are selected from the group of the following: income reduction, relocation, divorce, death, job loss, change in family makeup.

11. The home owner database management system for protection of mortgage holders as claimed in claim 7 further comprising criteria selectable by a member characteristic of said plurality of real property dwellings.

12. The home owner database management system for protection of mortgage holders as claimed in claim 7 further comprising repayment of a portion of equity held by a mortgage holder upon relinquishment of the real property dwelling.

13. The home owner database management system or protection of mortgage holders as claimed in claim 7 further comprising issuance of agreements representative of a transaction pertaining to said real property.

14. A method for protection of mortgage holders comprising the steps of:
  a. registering members having a mortgage obligation pertaining to a real property in a database on a server;
  b. storing data representative of a plurality of real properties;
  c. maintaining a member based group comprising said members and funding institutions having data representative of said registered members and said plurality of real properties;
  d. matching, by a computer, said registered members with one of said plurality of real properties upon request of one of said registered members based on one or more events;
  e. storing registered member's mortgage obligation into a database accessible to other members or third parties to assume or partially assume; and
  f. crediting one of said registered members with equity from said member's real property pertaining to said mortgage obligation for use in acquiring or renting one of said plurality of said real properties.

15. The method for protection of mortgage holders as claimed in claim 14 further comprising the step of generating transaction documents for one of said plurality of members pertaining to real property.

16. The method for protection of mortgage holders as claimed in claim 14 further comprising the step of selecting by a characteristic of said plurality of real properties.

17. The method for protection of mortgage holders as claimed in claim 14 further comprising the step of repaying a portion of equity held by a mortgage holder upon relinquishment of the real property.

18. The method for protection of mortgage holders as claimed in claim 14 wherein said event is selected from a group including death, relocation, job loss, divorce, and reduction in income.

19. The method for protection of mortgage holders as claimed in claim 14 wherein said real properties includes commercial properties.

20. The method for protection of mortgage holders as claimed in claim 14 further comprising the step of offering reverse mortgages to one of said plurality of members.

\* \* \* \* \*